(12) United States Patent
Chen et al.

(10) Patent No.: US 7,647,569 B2
(45) Date of Patent: Jan. 12, 2010

(54) SYSTEMS, METHODS, AND COMPUTER-READABLE MEDIA FOR ADJUSTING LAYOUT DATABASE HIERARCHIES FOR MORE EFFICIENT DATABASE PROCESSING AND STORAGE

(75) Inventors: Hao Chen, Boise, ID (US); Chin Le, Boise, ID (US); Stephen M. Krazit, Irving, TX (US)

(73) Assignee: Micron Technology, Inc., Boise, ID (US)

( * ) Notice: Subject to any disclaimer, the term of this patent is extended or adjusted under 35 U.S.C. 154(b) by 11 days.

(21) Appl. No.: 11/832,097

(22) Filed: Aug. 1, 2007

(65) Prior Publication Data

US 2009/0037861 A1 Feb. 5, 2009

(51) Int. Cl.
*G06F 17/50* (2006.01)
(52) U.S. Cl. .............................. 716/2; 716/18
(58) Field of Classification Search ................ 716/1, 716/2, 18
See application file for complete search history.

(56) References Cited

U.S. PATENT DOCUMENTS

| | | | |
|---|---|---|---|
| 5,740,068 A | 4/1998 | Liebmann et al. | |
| 6,319,644 B2 | 11/2001 | Pierrat et al. | |
| 6,370,679 B1 | 4/2002 | Chang et al. | |
| 6,634,018 B2 | 10/2003 | Randall et al. | |
| 6,783,904 B2 | 8/2004 | Strozewski et al. | |
| 6,973,637 B2 | 12/2005 | Sharpe et al. | |
| 7,024,638 B2 | 4/2006 | Scheffer et al. | |
| 7,239,997 B2 * | 7/2007 | Yonezawa | 703/19 |
| 7,302,672 B2 * | 11/2007 | Pack et al. | 716/19 |
| 2005/0188338 A1 | 8/2005 | Kroyan et al. | |
| 2005/0234684 A1 | 10/2005 | Sawicki et al. | |
| 2005/0251771 A1 | 11/2005 | Robles | |
| 2006/0085772 A1 | 4/2006 | Zhang | |
| 2006/0101428 A1 | 5/2006 | Adke et al. | |

\* cited by examiner

*Primary Examiner*—Jack Chiang
*Assistant Examiner*—Binh C Tat
(74) *Attorney, Agent, or Firm*—TraskBritt (57) ABSTRACT

Systems and methods are disclosed for organizing layout data. A layout database is analyzed to determine a statistical distribution of cells within the layout database based on a shape complexity of each cell. Cells with a shape complexity that exceeds a complex threshold may be defined as complex cells, which are examined to find candidate shapes that may be moved to one or more child cells within the complex cell. The layout database is then stored as an output layout database with at least some of these candidate shapes moved to child cells within the complex cells. Simple cells with a shape complexity that is less than a simple threshold may have their layout shapes moved to a parent cell of that simple cell. The layout database may also be partitioned into multiple dispatchable segments, which may be distributed to multiple processing threads for performing additional processes on the database.

30 Claims, 5 Drawing Sheets

SYSTEMS, METHODS, AND COMPUTER-READABLE MEDIA FOR ADJUSTING LAYOUT DATABASE HIERARCHIES FOR MORE EFFICIENT DATABASE PROCESSING AND STORAGE

FIELD OF THE INVENTION

Embodiments of the present invention relate to layout databases for semiconductor devices. More particularly, embodiments of the present invention relate to modifying layout database hierarchies to achieve more efficient database processing and storage.

BACKGROUND

Semiconductor devices are typically designed by connecting circuit and logic devices in arrangements to perform specific functions. To fabricate these arrangements, the circuits are represented as physical arrangements of geometric shapes, often referred to as a layout, on a variety of layers to be fabricated on the semiconductor device. The geometric shapes alone, or in combination with other shapes on other layers create the various circuit elements and other device elements such as wells, diffusion areas, oxidation regions, transistors, capacitors, interconnection signals, contacts, vias, passivation openings, and the like.

Generally, these geometric shapes are created using Computer Aided Design (CAD) systems to draw the shapes and create the circuit elements either by hand or in an automated fashion. With the layout created and stored in a database, the semiconductor device may be manufactured based on the layout database.

Photolithography, also termed optical lithography, is a well known process for transferring geometric shapes onto the surface of a semiconductor wafer. In the optical lithography process, a series of masks are created, which may be used for forming the various layers on the wafer. Masks may be formed on a sheet of transparent glass or quartz with the shapes from the layout database formed as opaque regions on the transparent sheet. The mask is positioned above the wafer and light is shone through the mask to expose areas of the wafer corresponding to the transparent regions of the mask and leave unexposed areas of the wafer corresponding to the opaque regions of the mask. A photoresist layer may be formed on a surface of the semiconductor wafer prior to this exposure. Areas of the photoresist layer exposed to the light may change state such that some of the photoresist may be removed to form a pattern of photoresist on the wafer that substantially matches the pattern on the mask. This pattern can then be used for etching underlying regions of the wafer or depositing additional layers in the areas not covered by photoresist. This process may be repeated for many masks and processing layers on the wafer until the semiconductor devices on the wafer are fully formed.

Semiconductor devices are continually becoming more complex with millions of devices, and their accompanying interconnect signals, possible on any given semiconductor device. Furthermore, layout databases may contain dozens of different layers for creating these devices and interconnect signals. As a result, layout databases have become extremely large and unwieldy to communicate between computers and to process the data within the layout database.

There is a need for systems and methods to modify these layout databases in a fashion to enhance the layout database for additional processing that may be required on the database, as well as to reduce the size of the database.

BRIEF DESCRIPTION OF THE DRAWINGS

In the drawings, which illustrate embodiments of the invention.

DETAILED DESCRIPTION

Embodiments disclosed herein comprise systems, methods, and computer-readable media for providing ways to modify layout databases to enhance the database for additional processing acts to be carried out on the database, reduce the size of the database, or combinations thereof.

In the following detailed description, reference is made to the accompanying drawings which form a part hereof, and in which is shown by way of illustration specific embodiments in which the invention may be practiced. These embodiments are described in sufficient detail to enable those of ordinary skill in the art to practice the invention, and it is to be understood that other embodiments may be utilized, and that structural, logical, and electrical changes may be made within the scope of the present invention.

Some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

Figure 1:
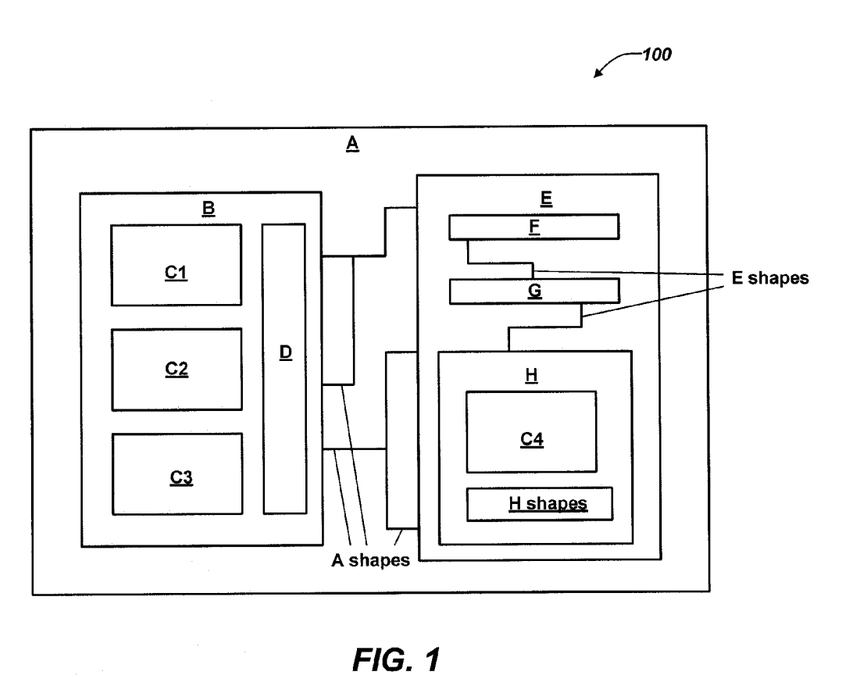
FIG. 1 is a simplified layout diagram of a semiconductor device illustrating a hierarchical design.
Figure 2:
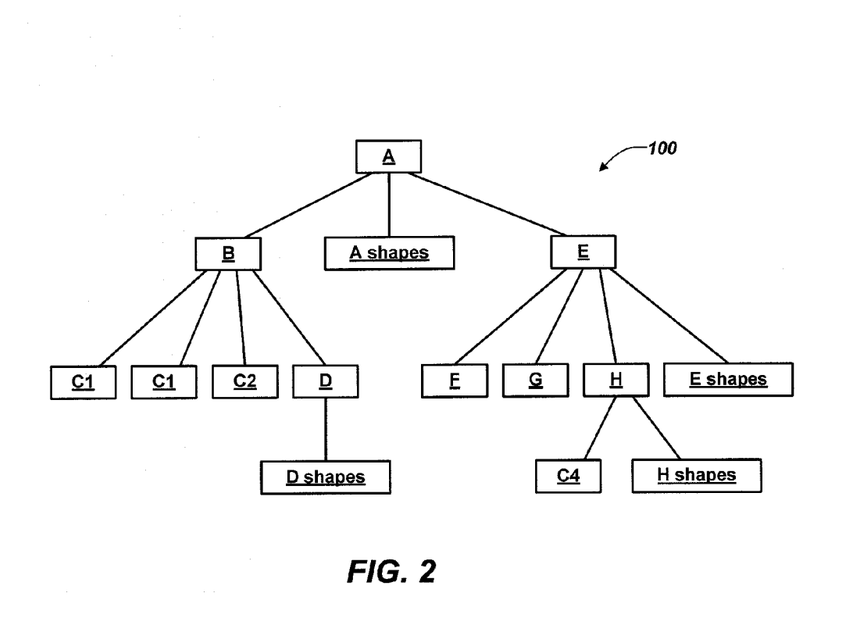
FIG. 2 is a tree diagram illustrating the hierarchy of the design of FIG. 1.

FIG. 1 is a simplified layout diagram of a semiconductor device illustrating a hierarchical design of a layout database 100. FIG. 2 is a tree diagram illustrating the hierarchy of the layout database 100. Layout databases may be configured in a number of ways using various standard languages. By way of example, and not limitation, a layout database 100 may be described in Graphical Data System II (GDSII) format or Open Artwork System Interchange Standard (OASIS) format. Generally, these databases may be configured hierarchically as cells that may contain additional cells and geometric shapes. These geometric shapes may be described as polygons with a number of vertices or paths with a defined width. Each geometric shape is assigned to a specific mask level in the design such that all levels of the hierarchy may be "flattened" to obtain all the shapes for a given mask layer. The geometric shapes may be referred to herein simply as "shapes." In conventional layout databases, shapes may appear at any level of the hierarchy. However, shapes are particularly prevalent at the lower level cells. The lowest level cells, often referred to as leaf cells, include only shapes and not any instances of other cells.

Typically, any given cell includes coordinates to identify where the cell is to be placed within the design. This placement may be defined globally within a global coordinate system for the layout, or may be defined locally as a placement within the parent cell containing the cell in question.

In FIGS. 1 and 2, a simplified hierarchy is shown for illustration purposes. Top level cell A includes cell B and cell E placed within the cell. Top level A also includes shapes (A shapes) defining specific layers. Cell B includes instances of cells C1, C2, and C3, as well as cell D. FIG. 2 illustrates that cell D includes "D shapes." Of course, while not explicitly illustrated, those of ordinary skill in the art will recognize that each of the lowest cells of the hierarchy will include shapes and not additional cell instances. In contrast, any cells not at the lowest level may include additional cells as well as shapes.

As with cell B, Cell E is at the second level of hierarchy. Placed within Cell E are cells F, G, and H. As illustrated in FIG. 2 cell E also includes "E shapes." Cell H is at the third level of the hierarchy and includes cell C4 and "H shapes."

In many cases, a cell may perform a particular function that is needed repeatedly in a design. For example there may be a specific cell for a memory, latch, flip-flop, or logic function. In these cases, the same cell may only need to be described once in the layout database 100 and simply placed in various other cells multiple times. Thus, in FIGS. 1 and 2 cells C1, C2, C3, and C4 may be the same cell, wherein cells C1, C2, and C3 are placed at different locations within cell B and cell C4 is placed at a specific location within cell H.

Those of ordinary skill in the art will recognize that FIGS. 1 and 2 illustrate a greatly simplified hierarchical design for purposes of describing embodiments of the present invention. Actual layout databases 100 may be extremely complex and embodiments of the present invention may be practiced with any level of complexity of databases that include two or more levels of hierarchy.

Layout databases 100 may undergo a number of modifications intended to make the layout more manufacturable. Generally, these modifications should not modify the function of the fabricated semiconductor devices and only create a design that may produce higher yielding results with fewer defects or make acts in the manufacturing process easier to perform.

Figure 3:
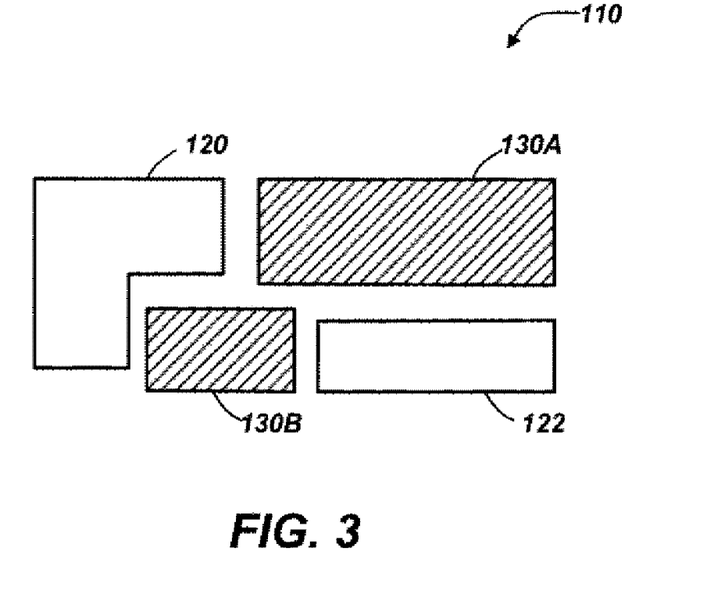
FIG. 3 is a simplified layout diagram illustrating design layout shapes and extra layout shapes that may be useful in a planarization process.

FIG. 3 is a simplified layout diagram 110 illustrating design layout shapes and extra layout shapes that may be useful in a planarization process. Semiconductor devices may undergo a planarization process wherein the surface of the wafer is ground, polished or etched to be as flat, or planar, as possible. Planarizing any given layer may be hampered by the underlying layers. As a result, many layout databases are modified to add "dummy shapes" to certain layers in order to give that layer more uniform coverage across the entire layout. In FIG. 3, shapes 120 and 122 are functional shapes, perhaps, for example, on a metal routing layer. A dummy layer fill process may be performed on the layout database to add dummy shapes 130A and 130B in order to create a more uniform fill for he metal layer. These dummy fill patterns may help create a more uniform layer of material that is formed on top of the metal routing layer. This more uniform layer of material will be easier to planarize. As stated earlier, the dummy fill patterns have no function in the design; they are there simply to make the manufacturing process more robust. However, the dummy fill patterns do add new shapes to the layout database, increasing the size of the database.

Figure 4:
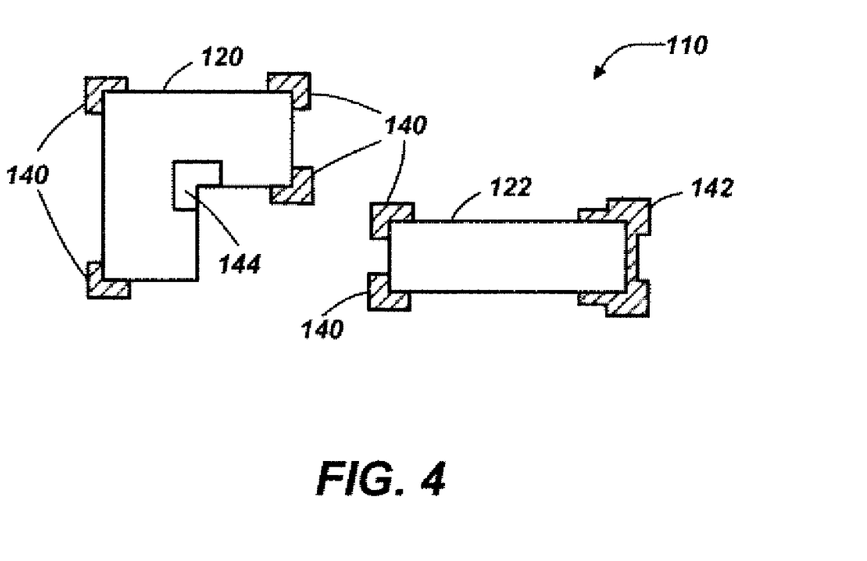
FIG. 4 is a simplified layout diagram illustrating design layout shapes and extra layout shapes that may be useful in an optical proximity correction process.

FIG. 4 is a simplified layout diagram 110' illustrating design layout shapes and extra layout shapes that may be useful in an optical proximity correction (OPC) process. As the critical dimensions of devices and metal routing layers continue to shrink with advances in semiconductor processing, the optical lithography process becomes more difficult. Several problems arise from the small feature sizes and inherent limitations of the imaging system. The high frequency light components needed to reproduce the sharp edges in polygon shapes may fail outside the capabilities of existing optical lens and mask components. In addition, stray light entering a mask opening from one shape may find its way into another shape on the wafer that is in close proximity to the desired shape. As a result, the final shapes on the wafer may have rounded corners or bulge toward other shapes. These shape distortions may cause shorts or open circuits, or cause devices to behave in unintended ways.

OPC attempts to compensate for these issues in he optical lithography process by modifying the originally designed shapes by adding additional shapes, or removing areas from existing shapes in an effort to create a modified shape on the mask that will reproduce the originally intended design shape on the wafer.

As non-limiting examples, FIG. 4 illustrates original shapes 120 and 122. These shapes are augmented by OPC shapes, which are often referred to as positive and negative serifs. These additional features that are added to the original layout database may be sub-resolution (i.e., have dimensions less than the resolution attainable by the exposure tools). Thus, rather than directly transferring to the resist layer, the OPC shapes act to improve the final transferred pattern at the wafer and compensate for proximity effects of nearby shapes. In FIG. 4, positive serifs 140 may be added to corners of the original layout shapes. Similarly, more complex positive serifs, such as serif 142 may be added. Furthermore, in some cases it may be desirable to add negative serifs 144 to reduce the overall coverage in critical areas. One can see from the simple examples of FIG. 4, hat adding OPC shapes can greatly increase the size of a layout database. For example, in the original design, shape 122 could be described by four vertices. However, after adding the OPC shapes, 24 vertices are needed to describe shape 122.

Figure 5A:
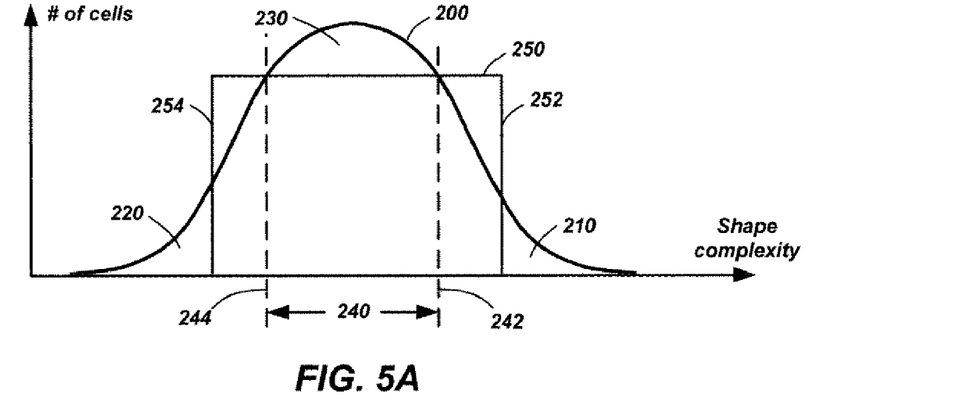
FIG. 5A is a distribution diagram illustrating a number of cells in a design hierarchy relative to cell complexity.

FIG. 5A is a distribution diagram illustrating the number of cells in a design hierarchy relative to shape complexity. Herein, shape complexity is defined as the amount of information necessary to define geometric shapes contained within that cell. Thus, a cell that includes only instances of other cells at a lower level of the hierarchy would have very low or zero shape complexity, because the cell itself includes no primitive geometric shapes, even though the cell may contain hundreds or thousands of other cells within its hierarchy. Conversely, a lower level cell with many primitive shapes may have a relatively high shape complexity.

If a hierarchical database is analyzed on a cell by cell basis relative to shape complexity, the results may be represented graphically as in FIG. 5A. The distribution of the cells may appear somewhat Gaussian as in statistical distribution curve 200. In FIG. 5A, the shape complexity is shown on the x-axis and the number of cells with any given shape complexity is shown on the y-axis. Thus, complex cells (i.e., cells with a high shape complexity) appear in a complex region 210. Conversely, simple cells (i.e., cells with a low shape complexity) appear in a simple region 220. Shapes with intermediate complexity appear in region 230 between a complex threshold 252 and a simple threshold 254.

In some processing acts that may need to occur on layout databases, it may be more desirable to have a distribution of shapes represented by target distribution curve 250. In this target distribution 250, there are little to no shapes with extremely high shape complexity and little to no shapes with extremely low shape complexity. As will be explained later, a distribution in the form of FIG. 5A may create a layout database that is smaller and enables more efficient processing of the layout database.

Of course, those of ordinary skill in the art will recognize that it may be diffi,cult to completely achieve the target distribution 250. Rather the target distribution 250 may be a beneficial distribution that embodiments of the present invention attempt to achieve.

Thus, an input layout database may be modified by attempting to reduce the shape complexity of complex cells such that a more uniform distribution of shape complexity across all cells can be achieved.

Figure 5B:
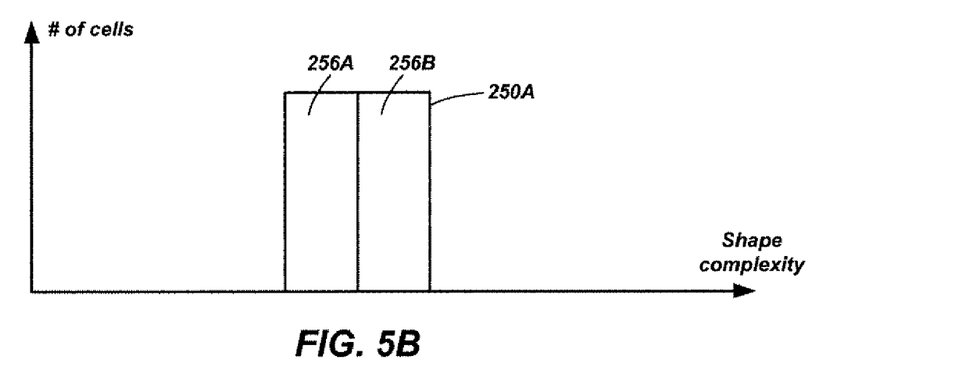
FIG. 5B is a simplified distribution diagram illustrating a contemplated distribution of cell complexity enhanced for processing with two independent processes.
Figure 5C:
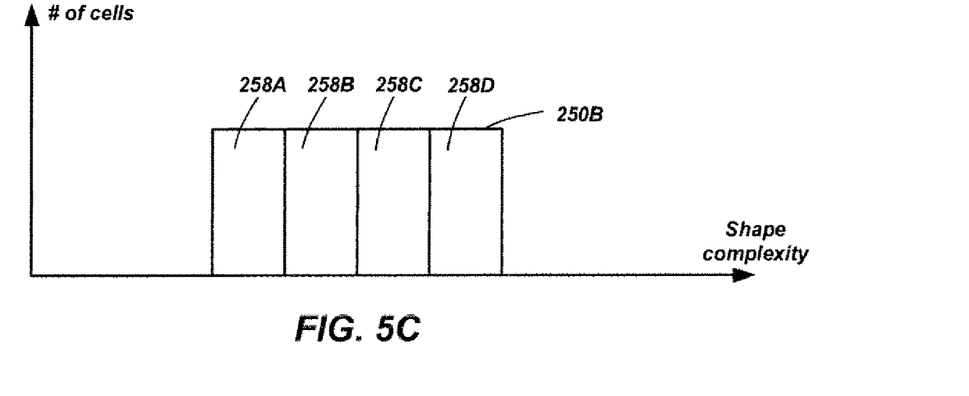
FIG. 5C is a simplified distribution diagram illustrating a contemplated distribution of cell complexity enhanced for processing with four independent processes.

The target distribution 250 and shape of the target distribution curve may depend on the layout database, the processing that must occur on the layout database, and computing resources available to perform the processing. For example, FIG. 5B illustrates a relatively tall uniform target distribution 250A wherein there are a large number of shapes with a relatively narrow distribution of shape complexity. FIG. 5C, on the other hand, illustrates a relatively squat target distribution 250B wherein there is a larger diversity of shape complexities but there are about the same number of cells at any given shape complexity. FIGS. 5B and 5C are discussed more fully below.

Figure 6:
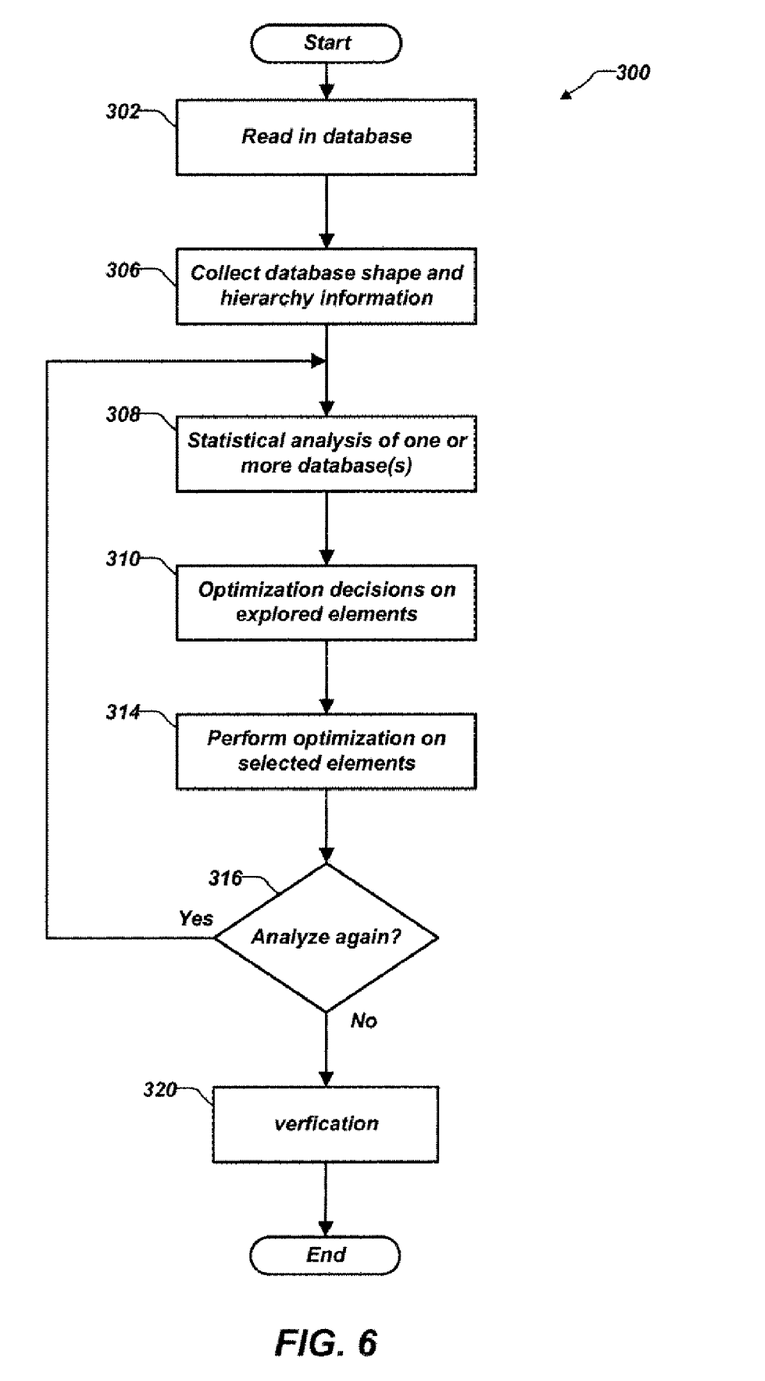
FIG. 6 is a simplified flow diagram illustrating a process for organizing layout data in a layout database.

FIG. 6 is a simplified flow diagram illustrating a process for organizing layout data in a layout database according to embodiments of the present invention. The FIG. 6 process may be implemented in software, or computer instructions. Software processes illustrated herein are intended to illustrate representative processes that may be performed by one or more computing system in carrying out embodiments of the present invention. Unless specified otherwise, the order in which the processes are described is not to be construed as a limitation. Furthermore, the processes may be implemented in any suitable hardware, software, firmware, or combinations thereof. By way of example, software processes may be stored on a storage device, transferred to a memory for execution, and executed by one or more processors.

When executed as firmware or software, the instructions for performing the processes may be stored or transferred on a computer-readable medium. A computer-readable medium includes, but is not limited to, magnetic and optical storage devices such as disk drives, magnetic tape, CDs (compact disks), DVDs (digital versatile discs or digital video discs), and semiconductor devices such as RAM, DRAM, ROM, EPROM, and Flash memory.

To begin, operation block 302 indicates that a starting layout database is read into a computer system. In operation block 306, the database's shape and hierarchy information is analyzed to determine how many shapes are contained with each cell of the database.

In operation block 308, statistical analysis is performed on the shape complexity of the cells within the database. In addition, this statistical analysis may include information gathered from other databases that have been run previously. These other databases may include other versions of the design in question, may be other designs with a similar hierarchy, or may be designs that contain cells similar to those in the layout database in question. Thus, a large amount of statistical information may be gathered and analyzed to determine what type of a shape complexity distribution may be desirable for the current design.

Based on the statistical analysis, optimization decisions 310 may be performed. An upper shape complexity limit (also referred to as a complex threshold) may be determined and a if desired a lower shape complexity limit (also referred to as a simple threshold) may be determined. As shown in FIG. 5A, the complex threshold 252 is shown at the right side of the graph and the simple threshold 254 is shown on the left side of the graph.

Returning to FIG. 6, operation block 314 indicates that an optimization is performed on selected elements. These selected elements may be cells with a shape complexity above the complex threshold 252 (FIG. 5A), cells with a shape complexity lower than the simple threshold 254 (FIG. 5A), or combinations thereof. The optimization process attempts to move cells that are outside the thresholds to within the thresholds by modifying the number of shapes that those cells contain.

Thus, for a very complex cell, the cell may be explored to determine if some of the shapes within the cell could be pushed down to a lower level of the hierarchy. For example, the shapes may be pushed down to children, or grandchildren of the complex cell. As an example, in FIGS. 1 and 2, cell E may be defined as a complex cell. Thus, embodiments of the present invention may examine the "E shapes" to determine if some, or all, of these shapes may be pushed down into cells F, G, H, or C4. By pushing some shapes down to children cells, the shape complexity of cell E may be reduced to the point where it is below the complex threshold 252 (FIG. 5A). Of course, an analysis of the lower level cells F, G, H and C4 may indicate that some of them may be able to accept more shapes than others and still remain below the complex threshold 252 (FIG. 5A). Thus, shape complexity of the currently analyzed cells can be balanced with the shape complexity of cells further down in the hierarchy.

If desired, and in a similar manner for a very simple cell, the cell may be examined to determine if the shapes within that cell may be pushed up to a parent cell. The result is that, while the cell may still exist in the hierarchical database, it no longer contains any shapes and has a shape complexity of essentially zero. This moving of the shapes from a cell to its parent cell may be referred to as exploding the cell. Thus, the simple cell is removed from the distribution curve because it has a shape complexity of zero. In addition, the parent cell has a higher shape complexity because it has adopted shapes from the child cell. As an example, in FIGS. 1 and 2, cell D may be defined as a simple cell. Thus, embodiments of the present invention may explode cell D and move the shapes from cell D into cell B.

As a further enhancement, and referring to FIG. 5A, the optimization process may select cells between the simple threshold 254 and the complex threshold 252 to adjust their shape complexity. For example, in FIG. 5A, there is a distribution of shapes that exceed the substantially horizontal line of target distribution 250. In other words, cells between a lower normal threshold 244 and a higher normal threshold 242. The optimization process may select a cell in this normal region 240 and attempt to push shapes up from that cell's children in to the cell in question in an effort to give the cell more shape complexity, thereby moving the cell to an area above the higher normal threshold 242, but lower than the complex threshold 252. Similarly, the optimization process may select a cell in the normal region 240 and attempt to push shapes down to children in an effort to give the cell less shape complexity, thereby moving the cell below the lower normal threshold 244, but higher than the simple threshold 254. This process of moving cells in the normal region 240 will assist in flattening the distribution towards the target distribution 250.

Returning to FIG. 6, decision block 316 determines whether another round of statistical analysis and shape redistribution should be attempted. If so, control passes to operation block 308 to repeat the process. If not, control passes to operation block 320. Depending on the implementation, the optimization process performed in operation block 314 may be able to generate a desired outcome on a single pass. However, in other embodiments, it may be advantageous to perform a first pass of shape redistribution, and then go through another statistical analysis and redistribution in an effort to get closer to the target distribution.

In operation block 320, a verification process may be performed to determine that the resultant database with the redistributed shapes still matches the input data base in the "flattened" state. In other words, the output layout database should match the input layout database if all the hierarchy of both databases is flattened such that all the shapes occur at the same level. Foremost in this verification process is that both layout representations describe the same continuous layout areas. With respect to typical layout design rule verification terminology this would mean that the exclusive-or (XOR) of the starting and ending layout representations is empty. In a "flattened" context then, it is the composite of the shapes, not their individual count, orientation, or complexity that is being compared. Secondary concerns may include shape complexity, overlap, non-orthogonal orientation, off-grid, etc., that would affect processing or interpretation by other CAD tools.

This process of shape redistribution can be understood more clearly if one considers that some tools for adding dummy fill shapes for planarization, and OPC shapes for optical compensation, may add all the newly created shapes at the top level of the hierarchy. Thus, in FIGS. 1 and 2, cell A would likely be extremely complex. Pushing shapes down from cell A into cells B and E would reduce the shape complexity of cell A and increase the shape complexity of cells B and E. The process of redistributing shapes can be repeated until a distribution of shape complexity approaches the target distribution 250.

Figure 7:
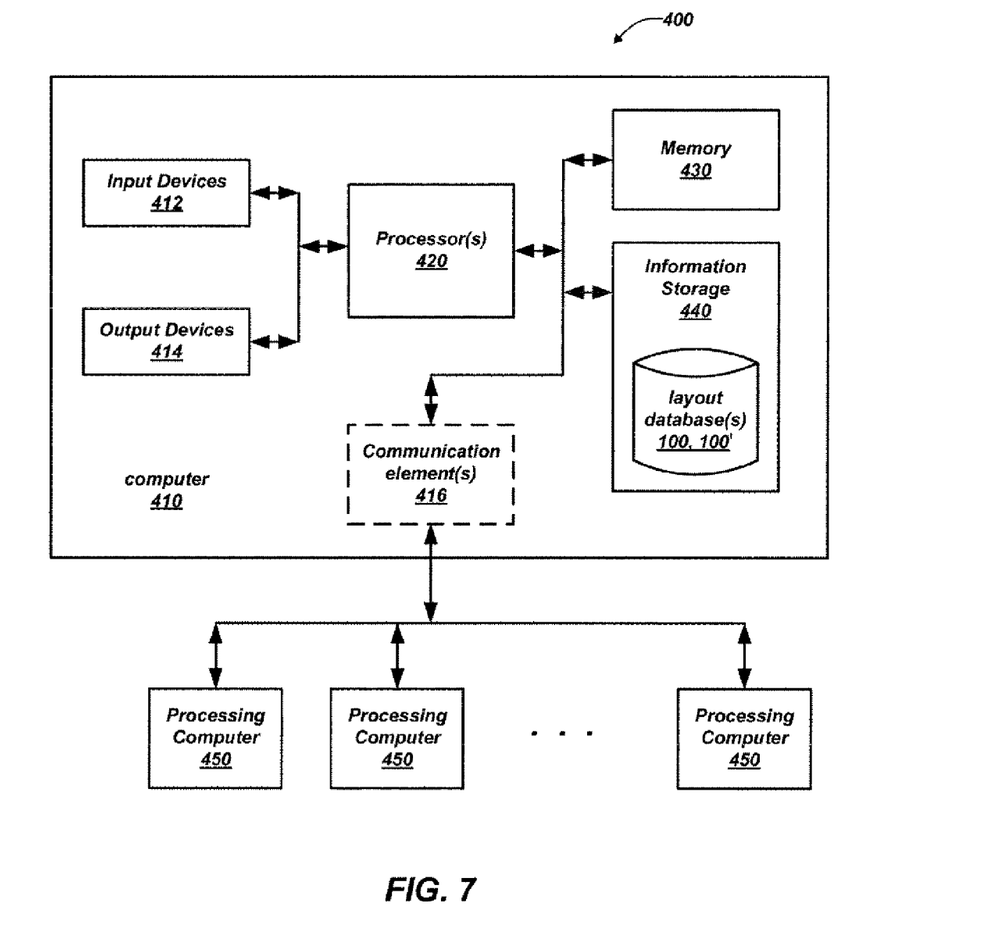
FIG. 7 is a simplified system block diagram of a computing system for practicing embodiments of the present invention.

FIG. 7 is a simplified system block diagram of a computing system 400 for practicing embodiments of the present invention. The computing system 400 includes a computer 410, and may include one or more additional processing computers 450. The computer 410 includes one or more processors 420, input devices 412, output devices 414, memory 430, and information storage 440. The input layout database 100 and output layout database 100' may be stored on the information storage 440, with portions of the layout database in memory 430 for easy access by the processors 420 to carry out embodiments of the present invention. The computer 410 may include communication elements 416 for receiving and sending information to and from the computer 410 by communication channels such as a wireless or wired interface. Thus, the layout databases (100 and 100') may be communicated between the computer 410 and processing computers 450 via the communication elements 416.

While not illustrated, those of ordinary skill in the art will recognize that each of the processing computers 450 may include a structure similar to that of the computer 410. In addition, the computer 410 and each of the processing computers 450 may include multiple processors 420. Finally, each of the processors 420 in the computer 410 and processing computers 450 may be capable of executing multiple threads, or processes.

Layout databases have become so large that they may take hours, days, or even weeks to process if all the processing is performed on one computer. As a result, parallel processing is often used to distribute the layout database processing between multiple computers.

One reason to generate a layout database with a target distribution 250 is that shapes can be easily segmented into groups of varying complexity. For example, in FIG. 5B the cells may be segmented into a lower complexity region 256A and a higher complexity region 256B. As another example, in FIG. 5C, the cells may be segmented into four different shape complexity regions 258A, 258B, 258C, and 258D.

With reference to FIGS. 7 and 5B, these varying but known complexity regions may be used by the computer 410 to more efficiently define tasks for itself and other processing computers 450. As an example, with a target distribution 250A such as is illustrated in FIG. 5B, the computer 410 may schedule an even distribution of cells from the lower complexity region 256A and the higher complexity region 256B to each of the available processing computers 450. In this fashion, tasks can be scheduled to ensure that one processing computer 450 is not stuck with an extremely complex cell and must continue to process that extremely complex cell while all the other cells have been completed by the other processing computers 450 and the other processing computers 450 have become idle.

As another example, perhaps some of the processing computers 450 have more computational power than others. In such a scenario, cells from the higher complexity region 256B may be scheduled for the more powerful processing computers 450 and cells in the lower complexity region 256A may be scheduled for the less powerful processing computers 450.

Many modern processors are capable of processing multiple independent threads. Thus, not only could cells be distributed between multiple processors more efficiently, they may also be distributed between multiple threads within those processors.

Of course, those of ordinary skill in the art will recognize that other shapes for the target distribution 250 (FIG. 5A) may be desirable. As stated, with a difference in processing power between processing computers 450, perhaps be distribution may be skewed toward having more cells in the lower complexity region 256A because there are many computers available with relatively low processing power and only a few computers available with a relatively high processing power.

There are many tasks that may be performed on a layout database before or after the shape redistribution performed by embodiments of the present invention. For example, the process for OPC and dummy fill shapes for planarization may be performed before shape redistribution. If that is the case, embodiments of the present invention may be used to create a more even shape distribution for subsequent tasks. On the other hand, embodiments of the present invention may be used to modify the layout database first, thus creating a more even shape distribution for the OPC and dummy shape generation processes. By way of example, and not limitation, other tasks that may be performed on the layout database before or after shape redistribution are Design Rule Checking (DRC), layout versus schematic verification, and mask generation.

CONCLUSION

Embodiments of the present invention include systems and methods for organizing layout data. These systems and methods include reading a layout database that includes cells and layout shapes at various (i.e., a plurality of) hierarchical levels. The layout database is analyzed to determine a statistical distribution of the cells based on the shape complexity of each cell in the layout database. Cells with a shape complexity that exceeds a complex threshold may be defined as complex cells. Each of these complex cells may be examined to find some candidate layout shapes therein that may be moved to one or more child cells within the complex cell. The layout database then may be stored as an output layout database with at least some of these candidate layout shapes moved to one or more child cells within the complex cells Embodiments of the present invention may also include finding simple cells with a shape complexity that is less than a simple threshold. The output layout database may then be stored with modifications that move the layout shapes of each of the simple cells to a parent cell of that simple cell. Embodiments of the present invention may also include partitioning the layout database into multiple substantially equal dispatchable segments and distributing these multiple segments to at least two processing threads for performing an additional process on the layout database.

Although the present invention has been described with reference to particular embodiments, the present invention is not limited to these described embodiments. Rather, the present invention is limited only by the appended claims, which include within their scope all equivalent devices or methods that operate according to the principles of the present invention as described.

What is claimed is:

1. A method, comprising:
    determining a statistical distribution of shape complexities for cells of a layout database;
    determining which of the cells are complex cells, wherein a shape complexity of the complex cells exceeds a complex threshold determining which of the cells are normal cells, wherein the shape complexity of the normal cells is between a lower normal threshold and a higher normal threshold;
    finding normal layout shapes within the normal cells;
    moving at least a portion of at least one layout shape in at least one of the complex cells to at least one child cell of the at least one of the complex cells moving at least one of the normal layout shapes within at least one of the normal cells to a related cell selected from the group consisting of a parent cell and a child cell; and generating at least one mask from the layout database using one or more processors.

2. The method of claim 1, further comprising reading the layout database, wherein the layout database comprises the cells and layout shapes at a plurality of hierarchical levels.

3. The method of claim 1, further comprising analyzing the layout database to determine the statistical distribution indicating the shape complexity for each of the cells.

4. The method of claim 1, further comprising exploring the complex cells to find candidate layout shapes within the complex cells as shapes to be used in the moving at least a portion of at least one layout shape.

5. The method of claim 1, further comprising storing an output layout database as the layout database with modifications made by the moving at least a portion of at least one layout shape.

6. The method of claim 1, further comprising:
    determining which of the cells are simple cells, wherein the shape complexity of the simple cells is less than a simple threshold; and
    wherein moving at least a portion of at least one layout shape further comprises moving the layout shapes of at least one of the simple cells to a parent cell of the at least one of the simple cells.

7. The method of claim 1, further comprising verifying that a flattened version of an output layout database after modifying the statistical distribution matches a flattened version of the layout database.

8. The method of claim 1, further comprising:
    partitioning an output layout database into at least two substantially equal dispatchable segments; and
    distributing the at least two substantially equal dispatchable segments to at least two processing threads for performing an additional process on the output layout database.

9. The method of claim 1, wherein the layout database includes at least one cell with at least one layout shape selected from the group consisting of dummy shapes and optical proximity correction shapes.

10. The method of claim 1, further comprising including statistical information from at least one other layout database when determining the statistical distribution of shape complexities.

11. A method, comprising:
    performing at least one act of the method on one or more processors;
    analyzing a statistical distribution comprising a shape complexity for cells of a layout database;
    selecting cells wherein the shape complexity exceeds a complex threshold;
    moving at least a portion of at least one shape in at least one of the complex cells to at least one child cell of the at least one of the complex cells; and
    modifying the statistical distribution of the layout database by:
    selecting normal cells wherein the shape complexity is between a lower normal threshold and a higher normal threshold; and
    moving layout shapes from at least one of the normal cells to a related cell selected from the group consisting of a parent cell and a child cell.

12. The method of claim 11, further comprising modifying the statistical distribution of the layout database by:
    selecting simple cells with a shape complexity less than a simple threshold; and
    moving layout shapes of at least one of the simple cells to a parent cell of the at least one of the simple cells.

13. The method of claim 11, further comprising verifying that a flattened version of the layout database after modifying the statistical distribution matches a flattened version of the layout database.

14. The method of claim 11, further comprising:
    partitioning the layout database into at least two substantially equal dispatchable segments; and
    distributing the at least two substantially equal dispatchable segments to at least two processing threads for performing an additional process on the output layout database.

15. The method of claim 11, wherein the layout database includes at least one cell with at least one layout shape selected from the group consisting of dummy shapes and optical proximity correction shapes.

16. The method of claim 11, further comprising including statistical information from at least one other layout database when analyzing the statistical distribution.

17. A computing system, comprising:
    a layout database comprising cells and layout shapes at a plurality of hierarchical levels; and
    a computer configured for:

analyzing a statistical distribution of the layout database by determining a shape complexity for at least some of the cells;

selecting complex cells wherein the shape complexity exceeds a complex threshold;

moving at least a portion of at least one layout shape in at least one of the complex cells to at least one child cell of the at least one of the complex cells;

determining which of the cells are normal cells, wherein the shape complexity of the normal cells is between a lower normal threshold and a higher normal threshold; and moving at least a portion of at least one layout shape in at least one of the normal cells to a related cell selected from the group consisting of a parent cell and a child cell.

18. The computing system of claim 17, wherein the computer is further configured for exploring the complex cells to find candidate layout shapes within the complex cells as shapes to be used in the moving the at least a portion of the at least one layout shape.

19. The computing system of claim 17, wherein the computer is further configured for storing an output layout database as the layout database with modifications made by the moving the at least a portion of the at least one layout shape.

20. The computing system of claim 17, wherein the computer is further configured for:

selecting simple cells wherein the shape complexity is less than a simple threshold;

moving the layout shapes of at least one of the simple cells to a parent cell of the at least one of the simple cells.

21. The computing system of claim 17, wherein the computer is further configured for:

partitioning the layout database into at least two substantially equal dispatchable segments; and distributing the at least two substantially equal dispatchable segments to at least two processing threads for performing an additional process on the layout database.

22. The computing system of claim 21, wherein the computer is configured to execute the at least two processing threads.

23. The computing system of claim 21, further comprising at least two processing computers and the at least two processing threads are distributed to the at least two processing computers.

24. The computing system of claim 23, wherein one of the at least two processing computers is the computer.

25. The computing system of claim 23, wherein the at least two processing computers are at least two computing cores on a single semiconductor device.

26. The computing system of claim 17, wherein the computer is further configured for including statistical information from at least one other layout database when analyzing the statistical distribution.

27. A computer-readable medium including computer-executable instructions, which when executed on a computer, perform the acts comprising:

analyzing a statistical distribution of a layout database by determining a shape complexity for cells in the layout database; and modifying the statistical distribution of the layout database by moving at least a portion of at least one layout shape in at least one cell to at least one child cell, wherein the shape complexity of the at least one cell exceeds a complex threshold;

determining which of the cells are normal cells, wherein the shape complexity of the normal cells is between a lower normal threshold and a higher normal threshold; and moving at least a portion of at least one layout shape in at least one of the normal cells to a related cell selected from the group consisting of a parent cell and a child cell.

28. The computer-readable medium of claim 27, further comprising computer-executable instructions, which when executed on a computer, perform the acts comprising:

partitioning the layout database into at least two substantially equal dispatchable segments; and distributing the at least two substantially equal dispatchable segments to at least two processing threads for performing an additional process on an output layout database.

29. The computer-readable medium of claim 27, further comprising computer-executable instructions, which when executed on a computer, perform the acts comprising:

determining which of the cells are simple cells, wherein the shape complexity of the simple cells is less than a simple threshold; and moving layout shapes of at least one of the simple cells to a parent cell of the at least one of the simple cells.

30. The computer-readable medium of claim 27, further comprising computer-executable instructions, which when executed on a computer, include statistical information from at least one other layout database when determining the statistical distribution of shape complexities.

* * * * *

UNITED STATES PATENT AND TRADEMARK OFFICE
CERTIFICATE OF CORRECTION

PATENT NO. : 7,647,569 B2
APPLICATION NO. : 11/832097
DATED : January 12, 2010
INVENTOR(S) : Hao Chen et al.

It is certified that error appears in the above-identified patent and that said Letters Patent is hereby corrected as shown below:

In column 9, lines 28–45, in Claim 1, delete
"1. A method, comprising:
determining a statistical distribution of shape complexities for cells of a layout database;
determining which of the cells are complex cells, wherein a shape complexity of the complex cells exceeds a complex threshold determining which of the cells are normal cells, wherein the shape complexity of the normal cells is between a lower normal threshold and a higher normal threshold;
finding normal layout shapes within the normal cells;
moving at least a portion of at least one layout shape in at least one of the complex cells to at least one child cell of the at least one of the complex cells moving at least one of the normal layout shapes within at least one of the normal cells to a related cell selected from the group consisting of a parent cell and a child cell; and generating at least one mask from the layout database using one or more processors."
and
insert -- 1. A method, comprising:
determining a statistical distribution of shape complexities for cells of a layout database;
determining which of the cells are complex cells, wherein a shape complexity of the complex cells
exceeds a complex threshold;
determining which of the cells are normal cells, wherein the shape complexity of the normal cells
is between a lower normal threshold and a higher normal threshold;
finding normal layout shapes within the normal cells;
moving at least a portion of at least one layout shape in at least one of the complex cells to at
least one child cell of the at least one of the complex cells;
moving at least one of the normal layout shapes within at least one of the normal cells to a related
cell selected from the group consisting of a parent cell and a child cell; and
generating at least one mask from the layout database using one or more processors. --, therefor.

Signed and Sealed this

Thirtieth Day of March, 2010

David J. Kappos
*Director of the United States Patent and Trademark Office*